(12) United States Patent
Kaneko et al.

(10) Patent No.: US 6,703,743 B2
(45) Date of Patent: Mar. 9, 2004

(54) MOTOR OR GENERATOR (75) Inventors: Yutaro Kaneko, Yokohama (JP); Shinichiro Kitada, Tokyo (JP); Toshio Kikuchi, Yokosuka (JP); Takashi Tsuneyoshi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 39 days.

(21) Appl. No.: 10/072,912

(22) Filed: Feb. 12, 2002

(65) Prior Publication Data
US 2002/0121827 A1 Sep. 5, 2002

(30) Foreign Application Priority Data
Mar. 2, 2001 (JP) ........................................ 2001-058116

(51) Int. Cl.[7] .............................................. H02K 21/12
(52) U.S. Cl. ............................ 310/156.38; 310/156.53; 310/156.02; 310/156.56
(58) Field of Search ...................... 310/156.38, 156.53, 310/156.02, 156.56, 156.01, 156.48, 156.51, 156.58, 156.68, 156.36, 156.43, 156.57

(56) References Cited

U.S. PATENT DOCUMENTS

| | | | | |
|---|---|---|---|---|
| 5,945,760 A | * | 8/1999 | Honda et al. | ........... 310/156.53 |
| 6,031,311 A | * | 2/2000 | Lee | ........................ 310/156.57 |
| 6,225,724 B1 | * | 5/2001 | Toide et al. | ................. 310/216 |
| 6,340,857 B2 | * | 1/2002 | Nishiyama et al. | ..... 310/156.53 |
| 6,359,359 B1 | * | 3/2002 | Miura et al. | ............ 310/156.43 |

FOREIGN PATENT DOCUMENTS

JP             11-4555         1/1990

* cited by examiner

*Primary Examiner*—Thomas M. Dougherty
*Assistant Examiner*—Leda T. Pham
(74) *Attorney, Agent, or Firm*—Foley & Lardner (57) ABSTRACT

A motor or a generator which has permanent magnets on a moveable member effectively reduces eddy current loss in the permanent magnets. A permanent magnet 1 which is provided for the moveable member of a motor or a generator, for example the rotor of a rotating motor, is divided into magnet sections (1A–1E) having divided widths (t1–t5) in response to the rate of change in the flux density in each divided magnet. Thus the eddy current loss in each magnet section (1A–1E) can be substantially equalized.

6 Claims, 9 Drawing Sheets

MOTOR OR GENERATOR

FIELD OF THE INVENTION

This invention relates to a motor or a generator having a movable member on which permanent magnets are disposed.

BACKGROUND OF THE INVENTION

In a motor or a generator having a movable member on which permanent magnets are disposed, an eddy current is generated on the surface of the permanent magnets due to high frequency components in the magnetic flux. The resulting eddy current loss causes the problem that the temperature of the permanent magnets is increased due to Joule heat produced by the eddy current.

Tokkai Hei 11-4555 published by the Japanese Patent Office in 1999 discloses a permanent magnet motor in which eddy current loss of the permanent magnets is suppressed. Since the magnet has a divided structure in this conventional example, the voltage in a single divided magnet is small. Furthermore the electrical resistance in a single divided magnet is large. Consequently the eddy current loss generated by the overall structure of permanent magnets can be eliminated.

SUMMARY OF THE INVENTION

Since the aforementioned conventional example does not take account of the asymmetrical nature of the variation in the flux density applied to the permanent magnet, an eddy current flows into and is concentrated in several of the divided magnets. Thus a large eddy current loss results in those magnets and their temperature increases.

Furthermore in the conventional example, the performance of the motor or generator may be greatly reduced as the magnetic force is reduced as a result of the increase in the number of divisions.

It is therefore an object of this invention to strategically reduce the eddy current loss without a crucial reduction of the magnetic force in a permanent magnet which is used in a motor or a generator having a movable member provided with permanent magnets.

In order to achieve above object, this invention provides a permanent magnet electrical machine used as a motor or as a generator, comprising: a movable member having a permanent magnet, and a stator having a coil which generates an alternating magnetic field to drive the movable member.

In the permanent magnet electrical machine, the alternating magnetic field applies a repulsive force on the permanent magnet, the permanent magnet is divided into a plurality of sections in order to suppress the flow of an eddy current generated by high frequency components in the alternating magnetic field, and at least one of the sections of the permanent magnet has the shape and dimensions which are determined, taking account of the position dependence of the rate of change in the flux density applied to the permanent magnet during fixed-speed operation of the movable member.

The details as well as other features and advantages of this invention are set forth in the remainder of the specification and are shown in the accompanying drawings.

BRIEF DESCRIPTION OF THE DRAWINGS

FIG. 1 describes a method of dividing a permanent magnet according to a first embodiment of this invention.

DESCRIPTION OF THE PREFERRED EMBODIMENTS

A first embodiment will be described referring to FIG. 1a–1c. FIG. 1c shows a permanent magnet 1 provided for the movable member of a permanent magnet electric motor. The electric motor may be a rotating motor or a linear motor. When the motor is driven, an alternating current magnetic flux (alternating magnetic field) for driving the movable member applies a repulsive force on the permanent magnet 1. This repulsive force displaces the movable member.

Figure 1A:
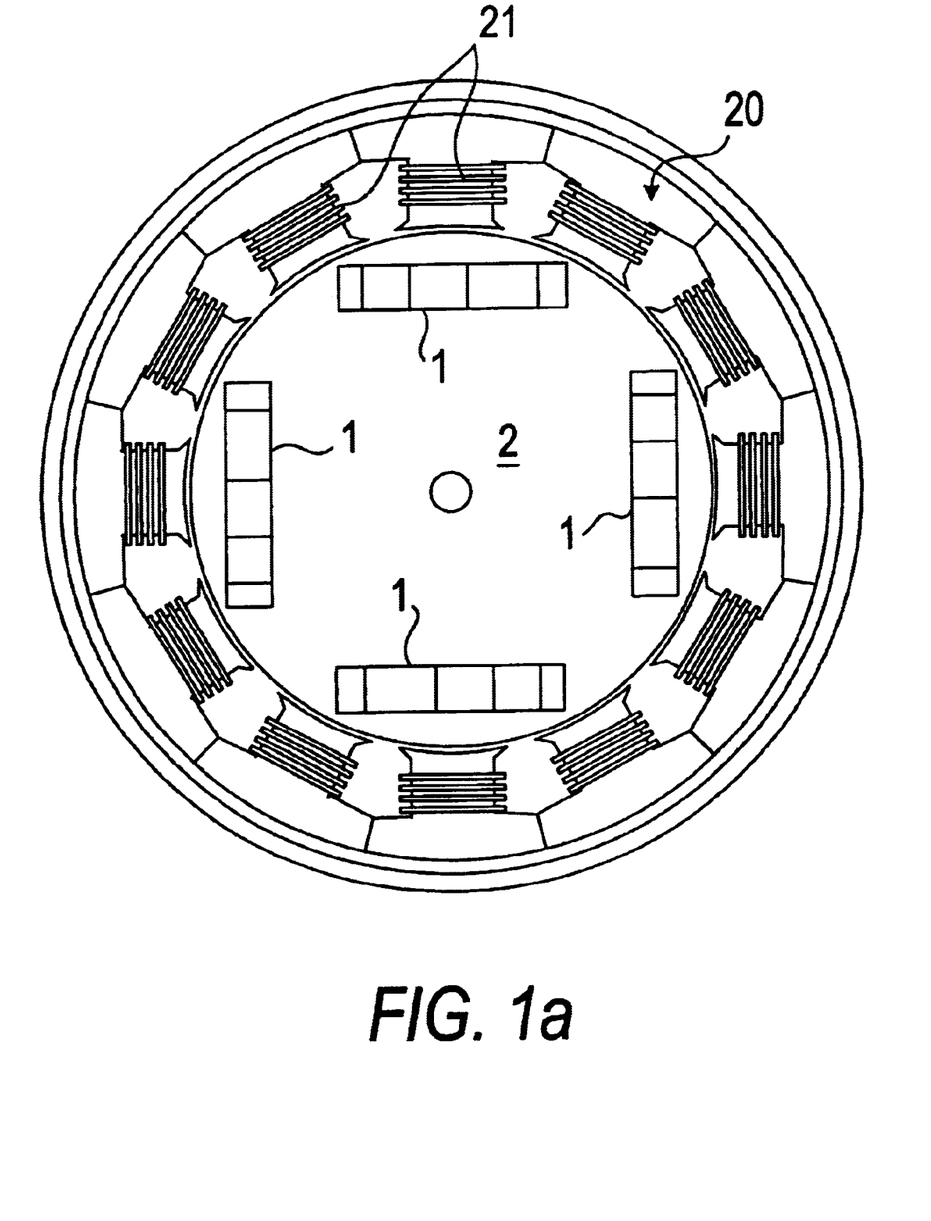
FIG. 1a is a cutaway top view showing the stator and rotor of a rotating electric machine embodying this invention.

In the case of a rotating motor, the permanent magnets 1 are disposed as shown in FIG. 1a, for example. This type of motor is known as an interior permanent magnet (IPM) motor in which permanent magnets are located in the core of the rotor (which is a movable member). The alternating current flowing in the stator coils 21 of the stator 20 disposed on the outer periphery of the rotor 2 applies a rotating magnetic flux on the rotor 2 and drives the rotor 2.

Referring to FIG. 1c, the permanent magnet 1 is divided by substantially flat faces into a plurality of sections 1A–1E, the sections electrically insulated from each other, in order to suppress the flow of eddy current resulting from high frequency components in the alternating magnetic field. The dimensions and shape of each section of the permanent magnet are set based on the rate of change in the flux density at positions in each section. Namely, they are set based on the position dependence of the rate of change in the flux density applied to the permanent magnet during fixed speed operation of the rotor 2. For example, the rate of change in the flux density is taken as a mean value of magnitude of the time-derivative of the flux density, or the difference between the maximum and minimum of the flux density in a rotational period.

The permanent magnet 1 is formed by assembling and integrating the magnet sections so that overall they have an elongated rectangular shape. The divided magnet sections are connected in series substantially along the direction of the motion of the permanent magnet 1. In the case of the rotating motor mentioned above, the direction of the motion of the permanent magnet of the rotor is defined as the direction of the speed vector (direction of rotation) at the center of the permanent magnet. For example, the permanent magnet 1 is integrated by an adhesive which has an electrically insulating property.

Figure 1B:
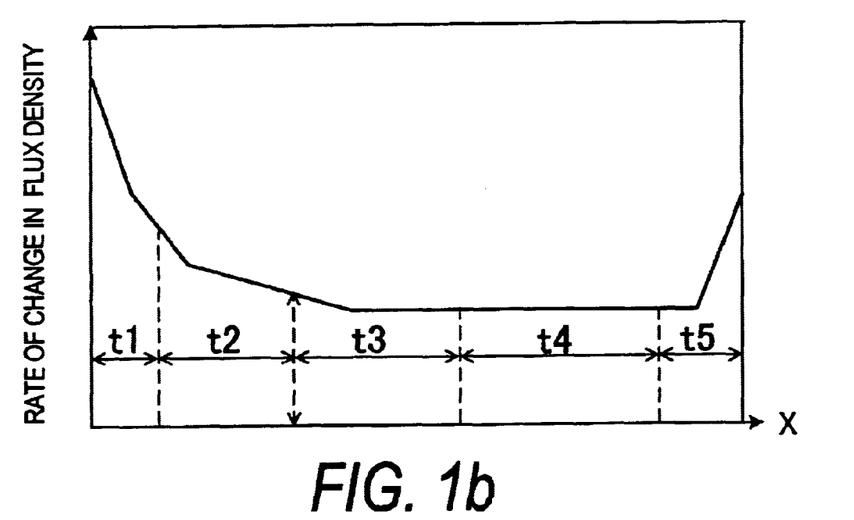
FIG. 1b is a graph showing the relationship of rate of change of flux density with respect to the position of the movable member in the direction of motion.
Figure 1C:
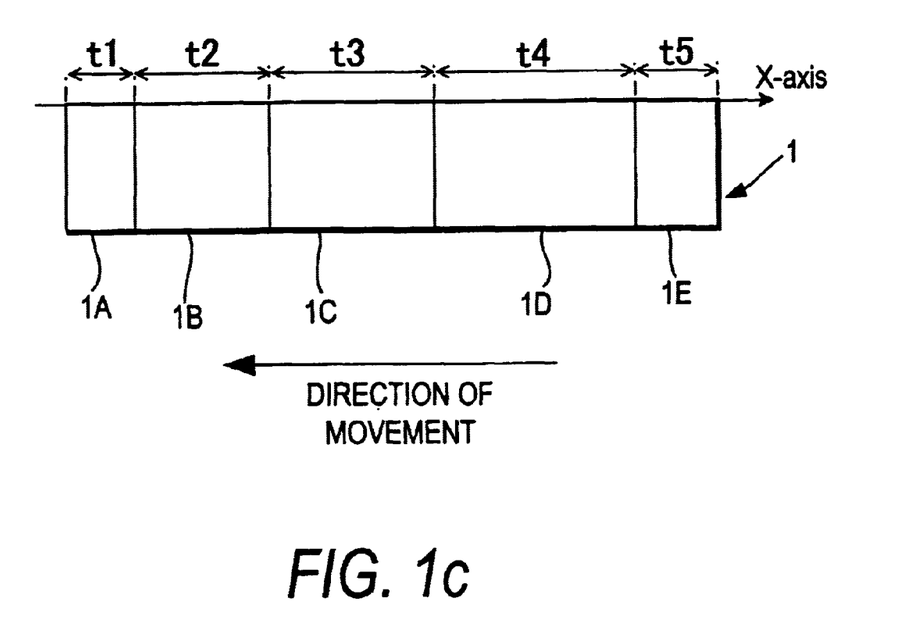
FIG. 1c shows a plan diagram of the permanent magnet.

The graph of FIG. 1b shows schematically the position dependence of the rate of change in the flux density in a longitudinal direction (on the X-axis set on the main surface of the magnet 1 as shown FIG. 1c) during fixed speed operation. Here, the longitudinal direction is parallel with the direction of the motion of the permanent magnet 1. The relationship of the rate of change in the flux density to the width of the magnet section 1A–1E shows that the width is small in magnet section at a position in which the rate of change in the flux density is large (for example, magnet sections 1A, 1E), as shown in FIG. 1b and 1c. Furthermore the width of the magnet section is wide for magnet sections at positions at which the rate of change in the flux density is small (for example magnet section 1C).

Thus, the width of each section of the permanent magnet is set in response to the rate of change in the flux density applied to that section during fixed-speed operation. In this manner, a particularly large eddy current loss does not occur in any magnet section 1A–1E. Therefore it is possible to suppress increases in the temperature of the magnet sections and the generation of eddy current loss in the overall permanent magnet 1.

The permanent magnets 1 are divided in a longitudinal direction (direction of motion) into a magnet section 1A having a width t1, a magnet section 1B having a width t2, a magnet section 1C having a width t3, a magnet section 1D having a width t4, and a magnet section 1E having a width t5. The width t1–t5 of each magnet section 1A–1E is determined in response to the rate of change of the magnetic flux generated on magnet sections when the motor is driven. To describe this in more detail, the width of the magnet sections 1A–1E may be determined so that the eddy current loss generated in each magnet section 1A–1E is equal.

Rationalizing the divisions in the permanent magnet 1 in the above manner makes it possible to suppress the generation of eddy currents without unduly increasing the number of divisions in the permanent magnet 1. The overall magnetic force of the permanent magnet 1 is not highly reduced by this process of dividing.

Figure 2:
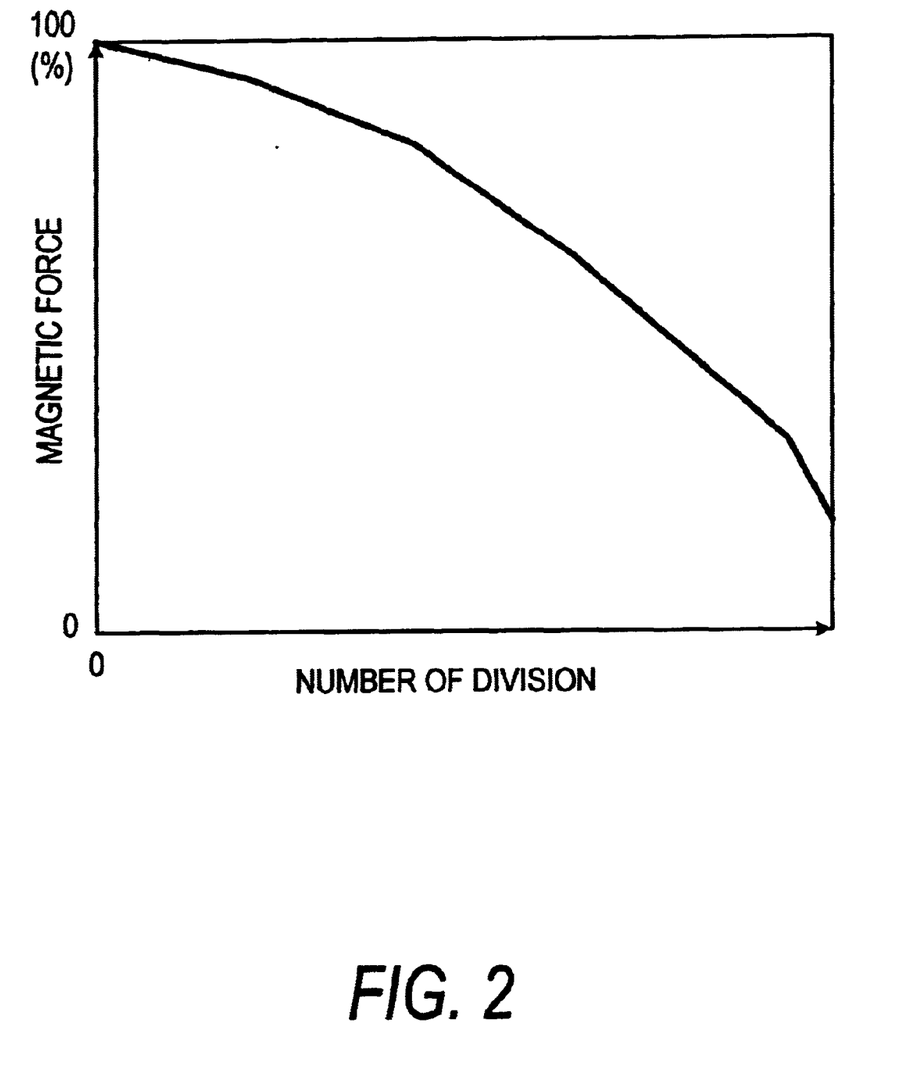
FIG. 2 is a graph showing the relationship of the ratio of magnetic force and the number of divisions in the permanent magnet.

As shown in FIG. 2, the ratio of magnetic force of the permanent magnet 1 (the magnetic force per unit volume) decreases as the number of divisions increases. Therefore, the number of divisions must be minimized in order to maintain the performance of a motor. The minimization of the number of divisions is strategically achieved by decreasing the width t1–t5 of the magnet sections 1A–1E as the rate of change in the flux density increases. As a result, crucial reductions in motor performance (output and efficiency) can be avoided.

In a permanent magnet linear motor and a permanent magnet rotating motor, permanent magnets are divided based on the rate of change in the flux density in a similar manner.

Figure 3:
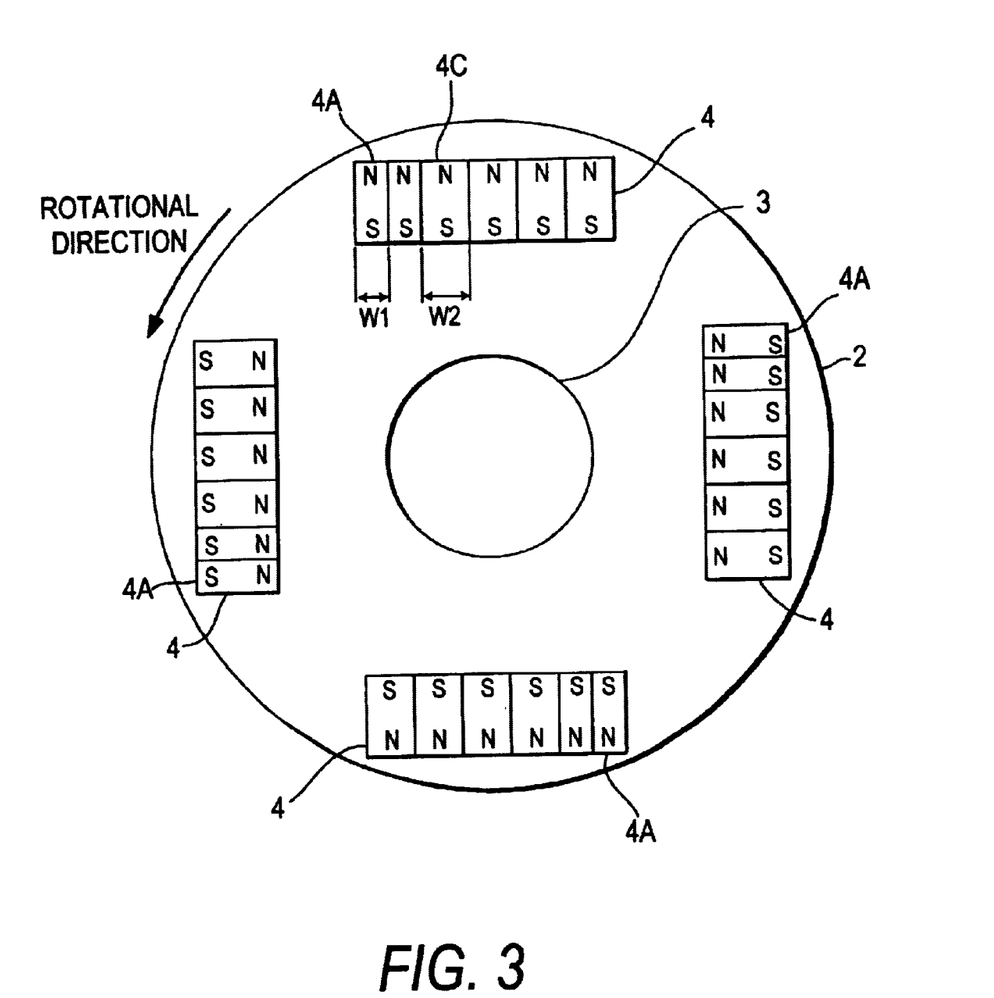
FIG. 3 is a lateral view showing the rotor of a motor according to a second embodiment of this invention.

A second embodiment of this invention is shown in FIG. 3. This invention is applied to a rotating motor in this embodiment. In this embodiment, the width of the magnet section lying in the leading edge of the permanent magnet is determined, taking into account the high rate of change in the flux density in the leading edge. FIG. 3 shows the rotor 2 (rotating element) of a permanent magnet rotating motor according to this embodiment.

The rotor 2 rotating about the rotation shaft 3 comprises a plurality of laminated steel plates which are laminated in the direction of the rotation shaft 3. More precisely, four permanent magnets 4 are disposed at intervals of 90 degrees in proximity to the outer periphery of the rotor 2. Each of the permanent magnets 4 is arranged along a perpendicular direction with respect to a radial direction of the rotor 2. Although the rotating element in this embodiment has permanent magnets with four poles, this is merely exemplary and this invention is not limited with respect to the pole number (or number) of permanent magnets.

A cylindrical stator (which is similar to the stator 20 of FIG. 1a) is disposed on the outer periphery of the rotor 2 in order to encircle the rotor 2. A rotating magnetic flux is generated by supplying an excitation current (for example a three-phase alternating current) to the stator coils of the stator. The rotor 2 rotates due to the repulsive force of the permanent magnets 4 against the magnetic flux. The method of coiling the coils of the stator coils may be concentrated winding or distributed winding.

The longitudinal direction of each permanent magnet 4 is set to substantially correspond to the peripheral direction (direction of rotation) of the rotor 2. The magnets are divided into a plurality of sections in a longitudinal direction (in other words, direction of rotation). The width W1 of the leading magnet section with respect to the direction of rotation is narrower than width of other magnet sections (for example, the width W2 of the magnet section 4C). This is because the rate of change of the flux density displays an increase in leading sections of the permanent magnets 4.

The width W1 of the leading magnet section 4A is set so that the eddy current generated in the leading magnet 4A is substantially equal to the eddy current generated in other magnet sections. In this manner, the eddy current in the leading magnet section 4A is reduced and as a result, it is possible to suppress the generation of an eddy current in the overall permanent magnet 4.

Figure 4:
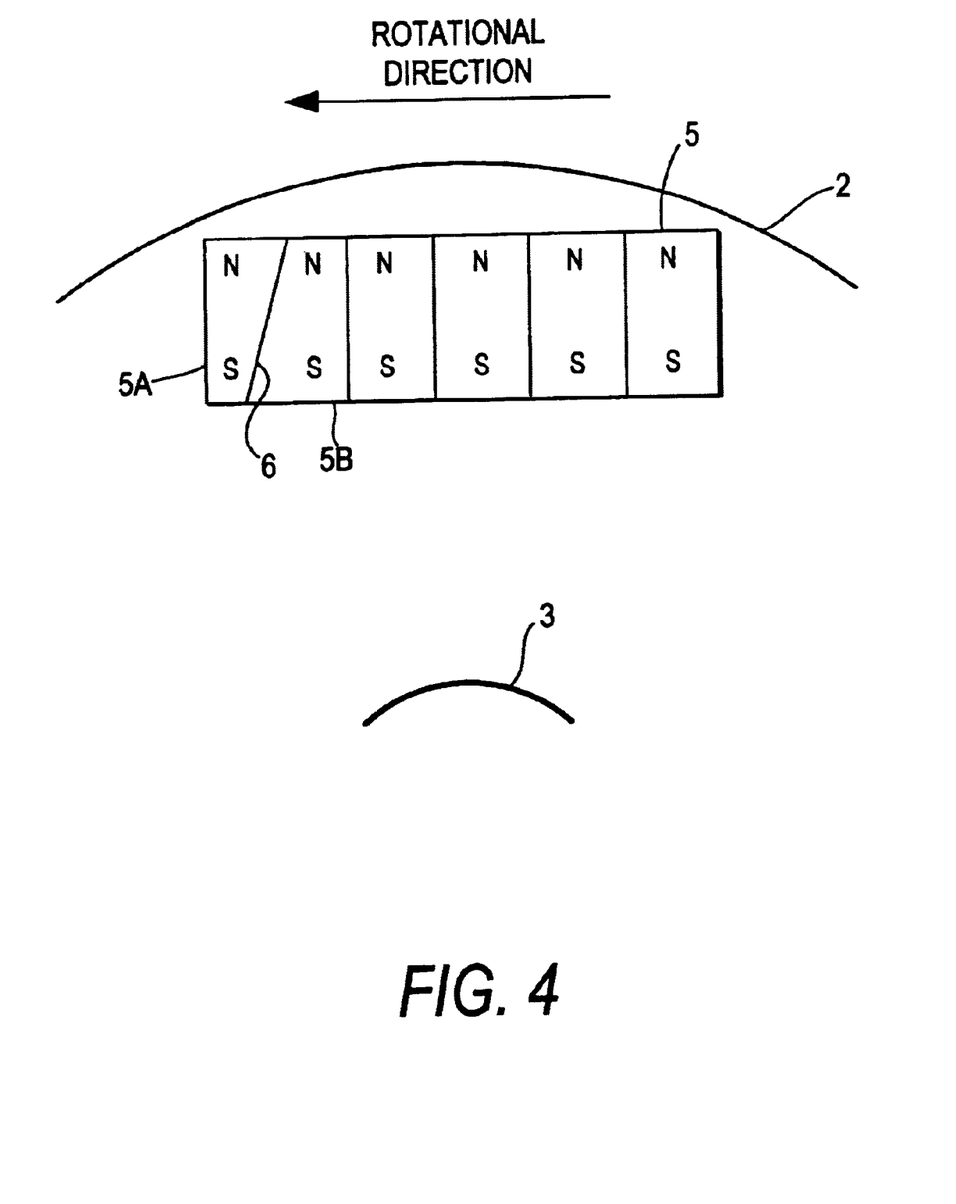
FIG. 4 is a partial schematic view showing a rotor of a motor according to a third embodiment of this invention.

A third embodiment of this invention will be described referring to FIG. 4 in which only one magnet is shown. In this embodiment, the shape of the magnet section lying at the leading edge of the permanent magnet is determined, taking into account the fact that rate of change in the flux density is high at the leading edge.

In this embodiment, although the permanent magnet 5 near the outer periphery of the rotor 2 is divided in almost the same manner as in the second embodiment, only the dividing face 6 between the magnet sections 5A and 5B at the tip is inclined, unlike the second embodiment. The magnet section 5A is placed on the leading edge with respect to the direction of rotation of the rotor 2 and the magnet section 5B is adjacent to the magnet section 5A. The direction of the dividing face 6 deviates from the direction perpendicular to a longitudinal direction, in contrast to the first and second embodiments.

Thus the width of the magnet section 5A increases towards the outer periphery of the rotor 2 when viewed from the rotation shaft 3 of the rotor 2. That is to say, the width of the magnet section 5A is wider on the outer peripheral side of the rotor 2 than on the inner peripheral side and the width of the magnet section 5B is narrower on the inner peripheral side of the rotor 2 than on the outer peripheral side. This arrangement allows effective decrease in the eddy current loss in the magnet section 5A by reducing the loop of the eddy current flowing therein. In this way, the characteristic increase in the rate of change in the flux density at leading edge with respect to the direction of rotation of the permanent magnet 4 can be compensated for.

Figure 5:
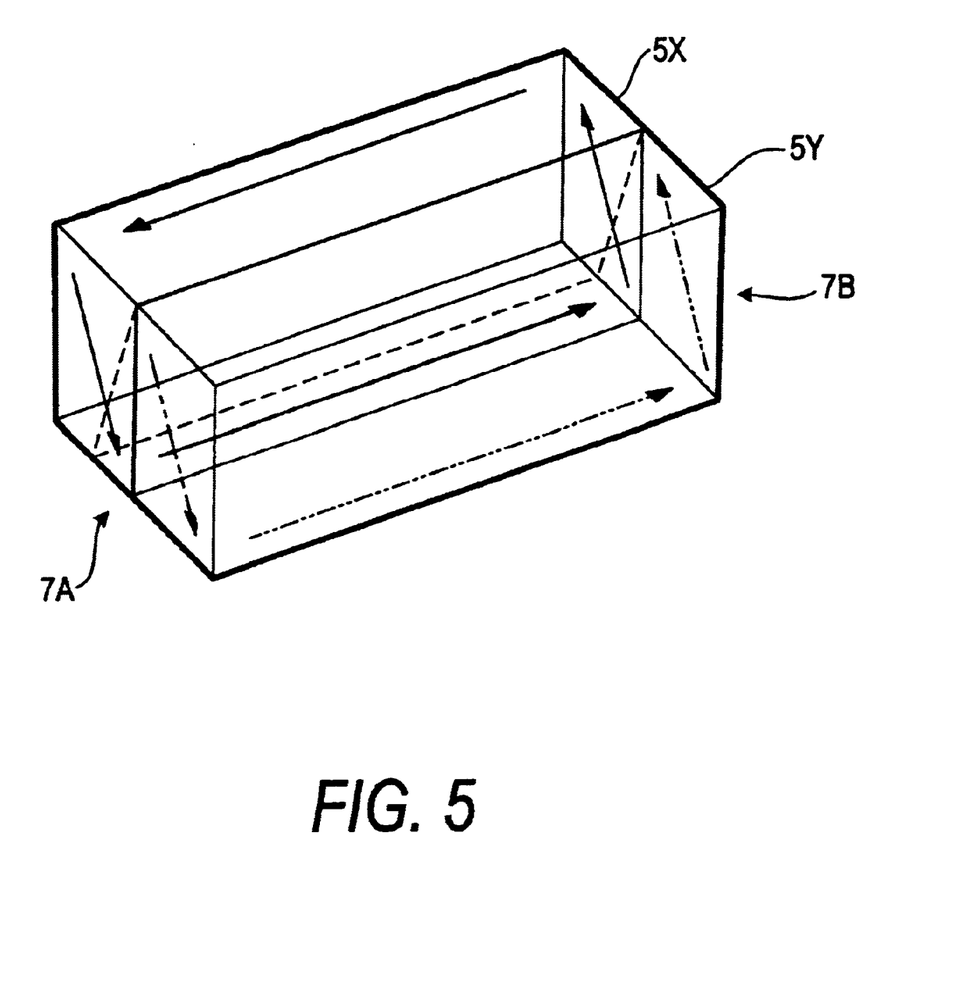
FIG. 5 shows the route taken by an eddy current in magnet sections on the leading edge of the rotor.

Referring to FIG. 5, when the dividing face is not inclined, an eddy current flows in the surface of the magnet sections 5X, 5Y on the leading edge of the magnet 5, as shown by the arrow in the figure. In FIG. 5, the dividing face between the magnets 5X and 5Y are perpendicular with respect to a longitudinal direction. The eddy current flows across both end faces 7A, 7B diagonally (the face on the front of FIG. 4 corresponds to the end face 7A). As shown by the broken line in FIG. 5, when the face separating the magnet sections 5X and 5Y are inclined at an angle from the direction perpendicular to the length of the magnet 5, the magnet sections 5X and 5Y have a shape with a trapezium cross-section as the aforesaid magnets 5A and 5B. Thus it is possible to reduce only the eddy current loop of the magnet section 5A (5X) without increasing the eddy current loop of the magnet section 5B (5Y).

Figure 6:
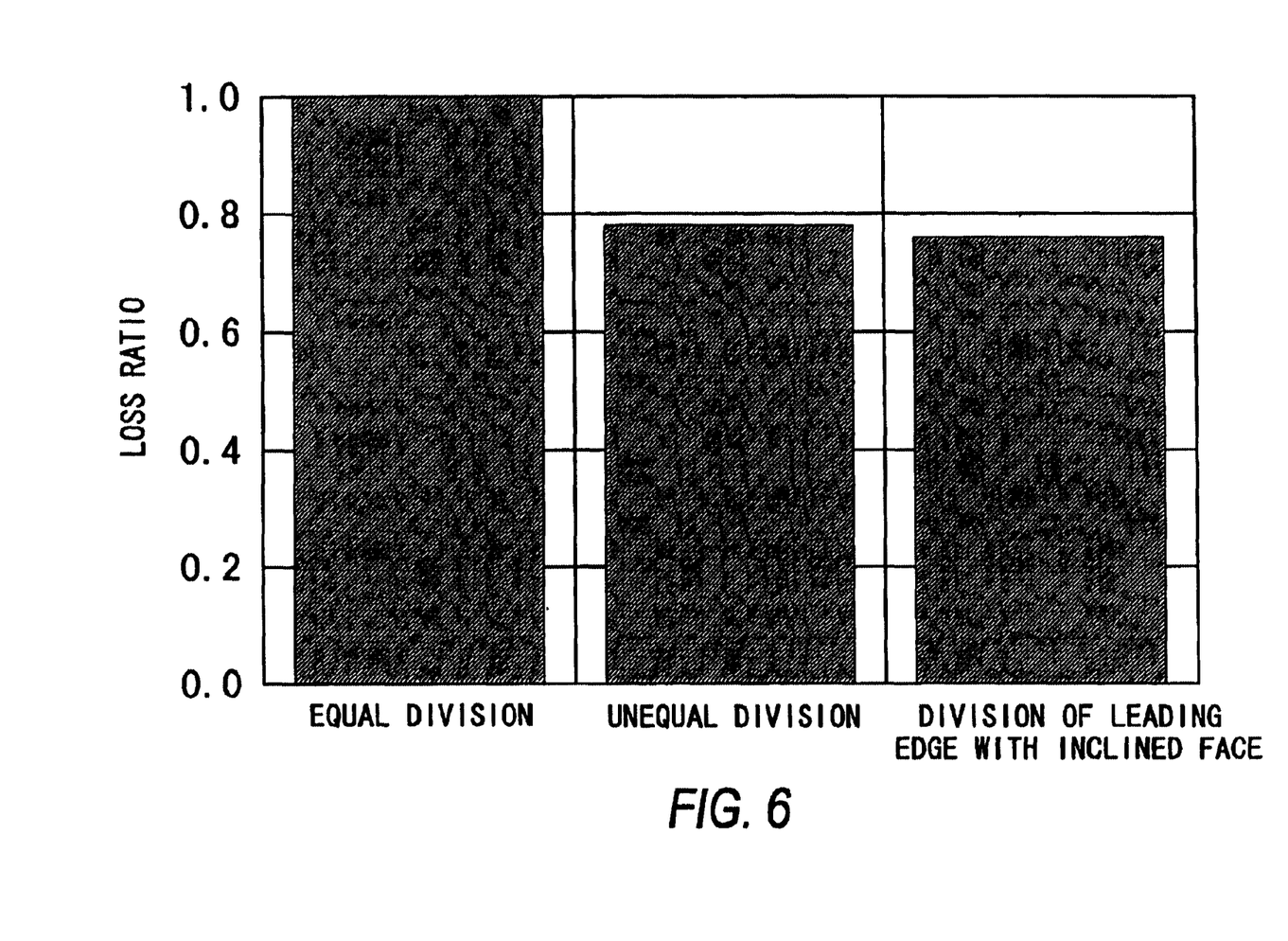
FIG. 6 is a graph showing eddy current loss in respective aspects of dividing the permanent magnet.

FIG. 6 shows eddy current loss when the permanent magnet is divided by the same number of sections in order to compare with a conventional example of equal division, an example according to the first and second embodiments of unequal division and an example according to the third embodiment of division by an inclined face.

As shown in the figure, in comparison to the conventional example, the loss ratio undergoes a large reduction when unequal division is used in this invention. The loss ratio undergoes even larger reductions when division of the leading edge with an inclined face is used in this invention.

Figure 7:
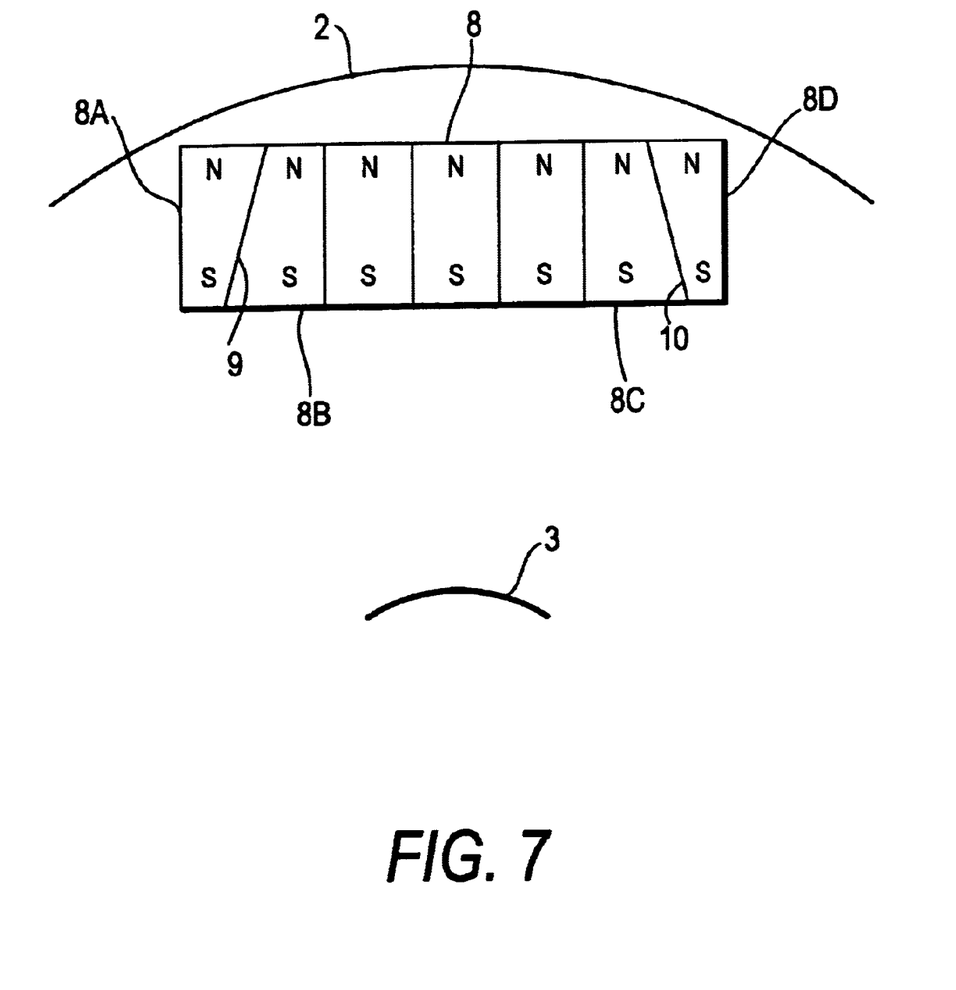
FIG. 7 is a partial schematic view showing a rotor of a motor according to a fourth embodiment of this invention.

A fourth embodiment of this invention will be described referring to FIG. 7. In this embodiment, in the same manner as in the third embodiment, the permanent magnet 8 is disposed substantially along the outer periphery of the rotor 2. The dividing face 9 of the end, between the magnet section 8A and the adjacent magnet section 8B, deviates from a perpendicular direction with respect to a longitudinal direction. The difference of this embodiment from the third embodiment lies in the fact that the dividing face 10 of the other end, between the magnet 8D and the adjacent magnet 8C, also deviates from the perpendicular direction. In this manner, the width of magnet sections 8A, 8D at both ends increases towards the outer periphery of the rotor 2. That is to say, the width of the magnet sections 8A, 8D is wider on the outer peripheral side of the rotor 2 than on the inner peripheral side.

Therefore it is possible to reduce the eddy current loop generated in the leading edge of the magnets 8A or 8D with respect to either a positive or reverse rotation of the rotor 2, by dividing both ends of the magnet 8 in the same manner.

Figure 8:
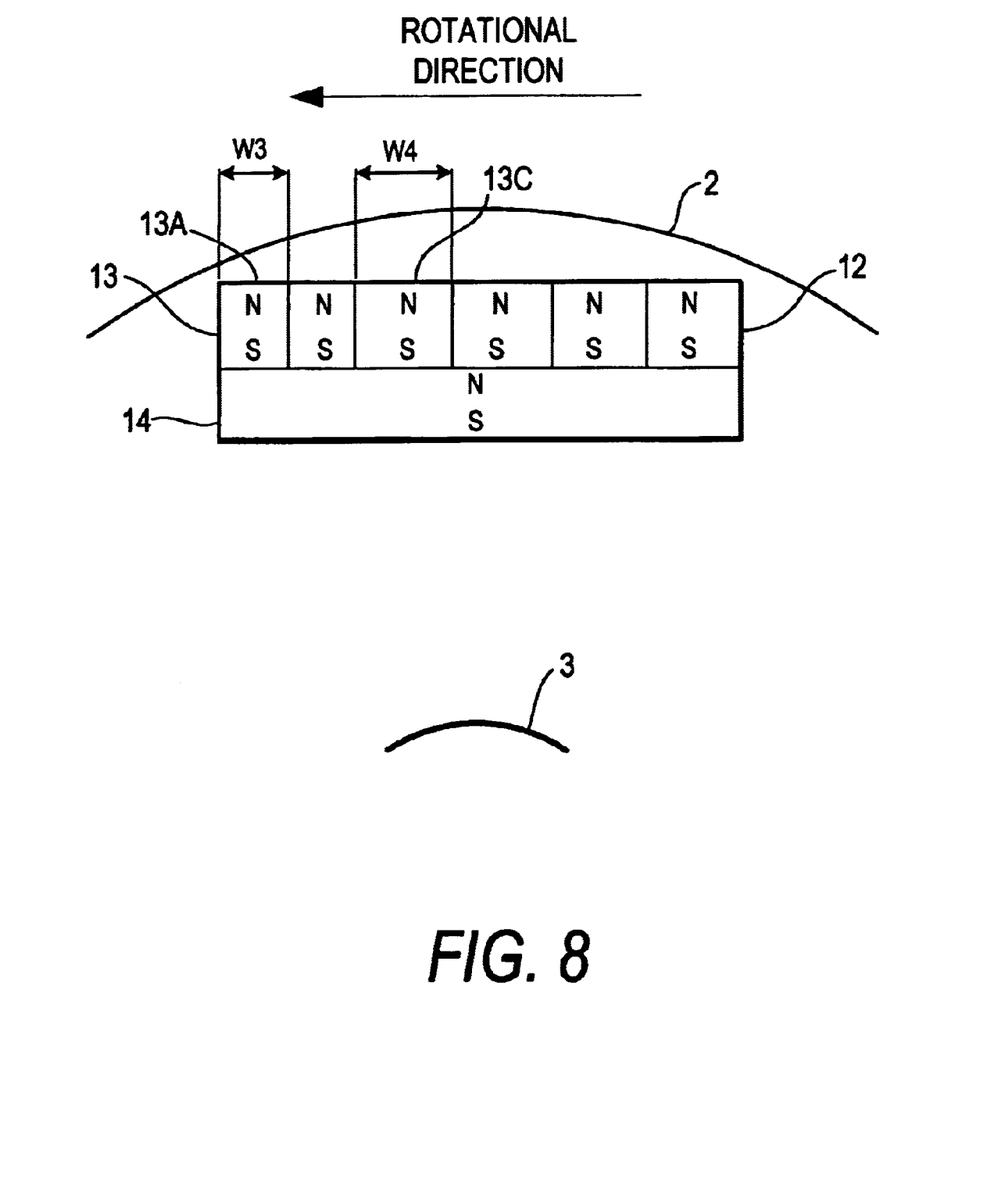
FIG. 8 is a partial schematic view showing a rotor of a motor according to a fifth embodiment of this invention.

A fifth embodiment of this invention will be described with reference to FIG. 8. In this embodiment, the permanent magnets 12 are disposed near the outer periphery of the rotor 2 in the same manner as in the third embodiment. The permanent magnets 12 are divided into a magnet portion 13 on the outer peripheral side of the rotor 2 (the stator side) and a magnet portion 14 on the inner peripheral side of the rotor 2 (the opposite side to the stator). The magnet potion 13 on the outer peripheral side of the rotor is divided into a plurality of magnet sections along its longitudinal direction (which substantially corresponds to the direction of the rotation of the motor 2). The width W3 of the magnet section 13A on the leading edge is narrower than the width of the other magnet sections (for example, the width W4 of the magnet section 13C).

Thus it is possible to make sufficient reductions to eddy current loss by dividing only the outer peripheral side of the magnet portion 13. In a rotating motor, the high frequency components in the variation in the flux density are only generated in proximity to the outer peripheral surface of the rotor 2 (sections facing to the stator). In this manner, it is sufficient to divide only the magnet portion 13 on the outer peripheral side of the rotor 2 in order to suppress the generation of an eddy current based on variation in the flux density due to high frequency components. Thus temperature increase in the magnet and the generation of an eddy current are effectively suppressed due to the arrangement in this embodiment. Since the permanent magnet portion 14 is not divided on the inner side of the rotor, it is possible to ensure a strong magnetic force in the overall permanent magnet 12.

In each of the embodiments above, the permanent magnet 1 has a rectangular shape. However this invention is not limited to this shape and for example, it is possible to apply this invention to permanent magnets having cross sections in the shape of a barrel or in a curved shape or a permanent magnet having another arbitrary shape.

Each of the embodiments above has been described with reference to a motor. However this invention may be applied to a generator or a motor/generator in exactly the same manner.

In the above embodiments, the rotating motor provided with a rotor on the inner side of the stator. However this invention may be applied to a rotating electric machine (motor, generator, motor/generator) provided with the rotor on the outer side of the stator or a rotating electric machine provided with the rotor on an inner and outer side of the stator. In this latter case, the outer and inner side of the rotor in the above embodiment are switched respectively to the stator side and the side opposite the stator. That is to say, as shown in the fifth embodiment above, when the permanent magnets disposed on the rotor are divided into two portions, they are divided into a plurality of sections on the stator side and not divided into sections on the side opposite the stator.

Although the invention has been described above by reference to certain embodiments of the invention, the invention is not limited to the embodiments described above.

The entire contents of Japanese Patent Applications P2001-58116 (filed Mar. 2, 2001) are incorporated herein by reference.

Modifications and variations of the embodiments described above will occur to those skilled in the art, in light of the above teachings. The scope of the invention is defined with reference to the following claims.

What is claimed is:

1. A permanent magnet electrical machine used as a motor or as a generator, comprising:
   a movable member having a permanent magnet; and
   a stator having a coil which generates an alternating magnetic field to drive the movable member, the alternating magnetic field applying a repulsive force on the permanent magnet,
   wherein the permanent magnet is divided with one or more substantially flat faces into a plurality of sections in order to suppress the flow of an eddy current generated by high frequency components in the alternating magnetic field, said one or more substantially flat faces being substantially perpendicular to the direction of motion of the permanent magnet, and
   wherein the width of each of the plurality of sections of the permanent magnet is set to decrease with an increase in the rate of change in the flux density in applied to each of the plurality of sections during fixed-speed operation of the moveable member.

2. A permanent magnet electrical machine used as a motor or as a generator, comprising:
   a movable member having a permanent magnet; and a stator having a coil which generates an alternating magnetic field to drive the movable member, the alternating magnetic field applying a repulsive force on the permanent magnet, wherein the permanent magnet is divided with one or more substantially flat faces into a plurality of sections in order to suppress the flow of an eddy current generated by high frequency components in the alternating magnetic field, said one or more substantially flat faces being substantially perpendicular to the direction motion of the permanent magnet, and wherein the width of each of the plurality of sections of the permanent magnet is set so that eddy current loss in each of the plurality of sections of the permanent magnet is substantially equal.

3. A permanent magnet electrical machine used as a motor or as a generator, comprising:

a rotating element having a permanent magnet; and a stator having a coil which generates an alternating magnetic field to drive the rotating element, the alternating magnetic field applying a repulsive force on the permanent magnet, wherein the permanent magnet is divided into a plurality of sections with respect to the direction of rotation of the rotating element in order to suppress the flow of eddy current generated by high frequency components in the alternating magnetic field, the width of the section placed on a leading edge in the direction of rotation of the rotating element being more narrow that the width of other sections.

4. The permanent magnet electrical machine as defined in claim 3, wherein the permanent magnet is divided into a pluarality of portions in a radial direction of the rotating element, and at least the portion of the magnet nearest the stator is divided with respect to the direction of rotation of the rotating element.

5. A permanent magnet electrical machine used as a motor or as a generator, comprising:

a rotating element having a permanent magnet; and a stator having a coil which generates an alternating magnetic field to drive the rotating element, the alternating magnetic field applying a repulsive force on the permanent magnet, wherein the permanent magnet is divided into a plurality of sections with respect to the direction of rotation of the rotating element in order to suppress the flow of an eddy current generated by high frequency components in the alternating magnetic field, and the section of the permanent magnet positioned on a leading edge where a rate of change in the flux density is larger than that in other sections has a width that increases towards an outer peripheral side of the rotating element in order to reduce the loop of eddy current in the section of the permanent magnet positioned on the leading edge.

6. The permanent magnet electrical machine as defined in claim 5, wherein the section of the permanent magnet positioned on the leading edge has a trapezoidal cross-section perpendicular to a rotation axis direction of the rotating element.

* * * * *